Dec. 22, 1925.
J. E. KELLEY
SAW
Original Filed Feb. 8, 1923
1,566,880
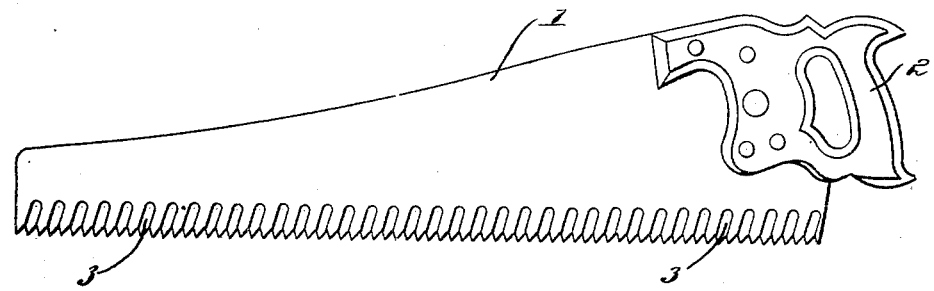
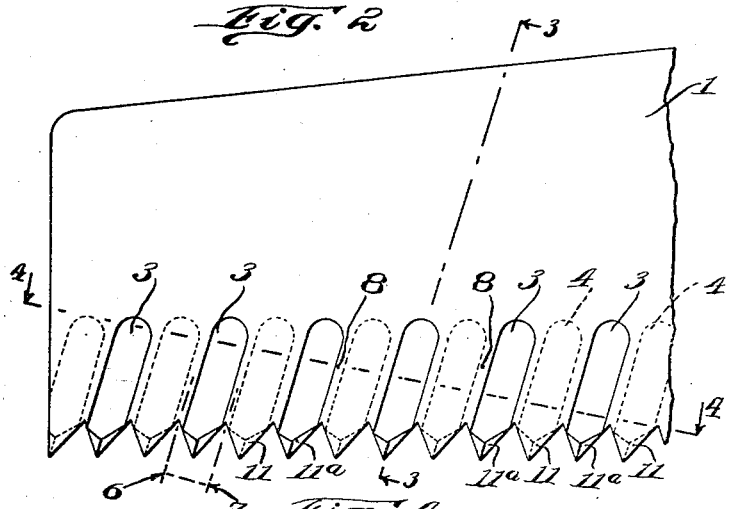
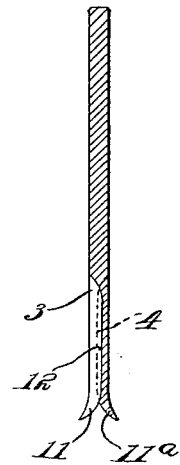
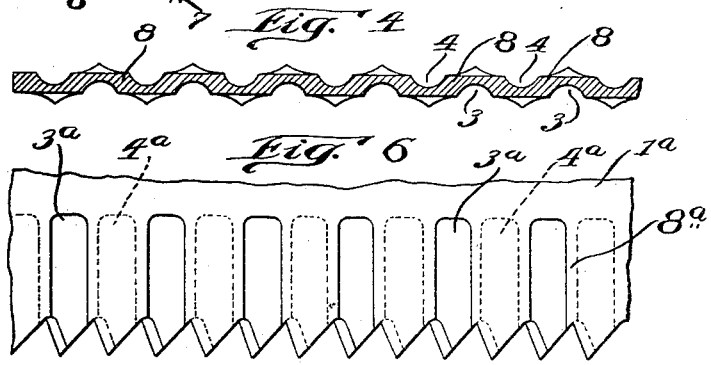
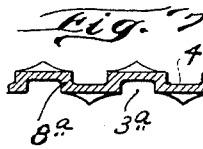
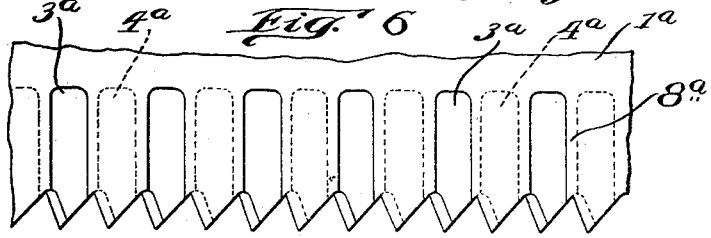
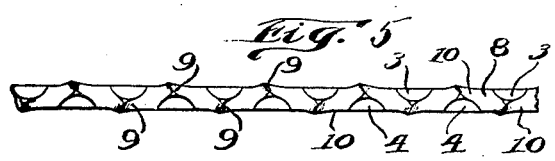
Inventor:
John E. Kelley Patented Dec. 22, 1925.

1,566,880

UNITED STATES PATENT OFFICE.

JOHN E. KELLEY, OF FITCHBURG, MASSACHUSETTS, ASSIGNOR TO SIMONDS SAW AND STEEL COMPANY, OF FITCHBURG, MASSACHUSETTS, A CORPORATION OF MASSACHUSETTS.

SAW.

Application filed February 8, 1923, Serial No. 617,738. Renewed July 18, 1925.

*To all whom it may concern:*

Be it known that I, JOHN E. KELLEY, a citizen of the United States of America, and resident of Fitchburg, in the county of Worcester and State of Massachusetts, have invented new and useful Improvements in Saws, of which the following is a specification.

This invention pertains to saws and relates to improvements in the toothed portion of a saw blade.

In the accompanying drawings,

Fig. 1 is a side elevation of a hand saw of usual type but having the present improvements embodied therein;

Fig. 2 is a fragmentary side elevation to larger scale showing a portion of the saw blade embodying the present invention;

Fig. 3 is a fragmentary cross-section on the line 3—3 of Fig. 2;

Fig. 4 is a cross-section on the line 4—4 of Fig. 2;

Fig. 5 is a bottom plan view of the structure shown in Fig. 2;

Fig. 6 is a fragmentary side elevation of the toothed portion of a saw blade showing a modified construction; and Fig. 7 is a view similar to Fig. 4 but illustrating a further modification.

As ordinarily constructed saw blades are of maximum thickness adjacent to their toothed edges and as the force necessary for moving a saw during the cutting operation varies with the thickness of the blade other things being equal it is manifestly desirable to make the toothed portion of the blade as thin as possible. The minimum thickness is determined to a greater or less extent by the stiffness demanded in the particular type of saw under construction and by the ability of the blade to withstand the lateral and longitudinal stresses to which it may be subjected in use so that in most, if not in all cases, the cutting edge of the blade is much thicker than is desirable for easy operation.

In accordance with the present invention it is possible to provide a saw having teeth whose cutting edges are much narrower than in usual practice, while the blade may be made of any suitable thickness and stiffness requisite to durability and proper operation. Such a saw, having teeth provided with narrow cutting edges is much easier to operate than the ordinary saw, not only on account of the smaller chip removed by each tooth but also by reason of the unusual clearance space afforded in the construction employed.

The essential features of the present invention are herein illustrated as embodied in a hand saw having a blade 1 provided with teeth along its lower edge and a handle 2 for operating it. This embodiment of the invention is by way of illustration only, as the improved construction is equally applicable to circular saws or in fact to saws of any ordinary type. The upper or main body of the blade 1 is of a thickness appropriate to the particular use for which the saw is intended but the toothed portion is provided with a series of recesses 3, 4 respectively in its opposite sides, the inner walls of the recesses preferably being transversely curved as shown in Figs. 4 and 5. These recesses are conveniently formed by grinding or some similar operation and the recesses of each series are substantially parallel and extend transversely of the cutting edge of the blade. The recesses upon one side of the blade are staggered with relation to those of the other (see Fig. 4) and the tooth projections with their cutting edges 9 are formed in the thin metal 10 constituting the inner walls of the several recesses so that the cutting edges of each tooth may be much narrower than the thickness of the main body of the blade. When properly constructed, the cutting edges of the teeth are disposed substantially symmetrically with respect to the corresponding recesses, that is to say about midway of the widths of the recesses. As successive recesses are disposed alternately upon opposite sides of the blade, successive teeth of the saw are not in alignment but constitute two relatively offset series designated 11, 11$^a$ respectively, the teeth of one series being flush with one side of the saw and the teeth of the other being flush with the opposite side of the same. As the depth of the recess determines the thickness of the tooth, it is clear that the cutting edges of the teeth may be made very narrow if desired and if of less than one-half the thickness of the blade proper, the teeth of the two series will not overlap at their inner faces but will be laterally spaced as shown at 12 in Fig. 3.

In Fig. 2 the width of a tooth space, that is to say, the distance between corresponding points in the bases or roots of the several teeth is indicated by the line 6, 7 and comparing this distance with the width of a recess 3 or 4, it is evident that the latter is substantially less than the tooth space so that between adjacent teeth there remains a web 8 of metal of substantially the original thickness of the blade and extending downwardly from the main body of the blade. These thick webs form strengthening pillars which are necessary if the saw is to be of practical utility in order to provide the requisite stiffness and rigidity of the toothed portion of the blade and to prevent buckling of the teeth under the cutting pressure, or the transverse bending or breaking of the teeth by slight blows or other lateral stresses such as would readily damage or destroy the teeth were the recesses of greater width than the tooth spaces, as in the latter case the material between the teeth would be very thin and weak and would be utterly inadequate to support the teeth under conditions commonly met in use. By making the recesses with curved inner walls it is possible to form the cutting edges of the tooth at the thinnest part of the metal forming the inner wall of the recess while providing metal of gradually increasing thickness at either side of the cutting edge so that a tooth projection is very strong and rigid.

In the construction shown in Figs. 1 and 2 the recesses incline rearwardly. This arrangement is desirable for the reason that each time a saw is sharpened, unless unusual care be exercised, the teeth are displaced slightly to the rear, this being due apparently to the tendency of the saw sharpener to file or grind more material from the front face of the tooth and also by reason of the fact that the front face of the tooth, being somewhat shorter, is abraded more rapidly. With the inclined arrangement of the recesses, the cuttitng edges of the teeth remain substantially central of the corresponding recesses even after repeated sharpening, whereas if the recesses were perpendicular to the cutting edge, the edges of the teeth would gradually be worked back until they coincided with the webs or pillars 8, unless unusual care were taken in performing the sharpening operation.

The narrow cutting edges provided by this invention make the saw much easier to operate than a saw of the same type but of usual construction. Among the reasons for this ease of operation may be mentioned the fact that each tooth edge is called upon to cut a much smaller chip than usual and that alternate teeth are out of line so that each successive tooth engages a chip which is unsupported at the center line of the kerf and is thus much easier to remove than were the chip united at both sides of the kerf to the material being cut. The recesses also furnish clearance spaces for the chips so that binding of the saw in the kerf is substantially eliminated even in cutting green or resinous woods, while the saw thus constructed appears to operate equally well whether used for splitting or cutting off.

In Fig. 6 the saw blade 1ª is illustrated as provided with a series of recesses 3ª and 4ª in each side with intervening webs or pillars 8ª as in the preceding example, but these recesses are substantially perpendicular to the direction of movement of the saw. Such a construction when new is in most respects equal to that previously described, but greater care must be exercised in sharpening it in order to keep the cutting edges of the teeth in proper relation on their separating webs.

In Fig. 7 the recesses 3ᵇ and 4ᵇ are shown as of substantially rectangular cross section which may be found desirable under certain circumstances, but the preferred construction is that previously described wherein the recesses are of curved or arcuate section.

When the recesses are inclined to the cutting edge the proper angle of inclination will be determined with respect to the particular type of saw and the conditions under which it is normally used and sharpened, and this angle may vary to a very substantial degree in the different classes of saws. The relative widths of the recesses and intermediate webs or pillars may also be varied in accordance with the type of saw or the metal employed in its construction, while the depth of the recesses may, as above pointed out, be varied whereby to vary the width of the cutting edges of the teeth. In whatever way the details of construction be varied from those herein disclosed, it is regarded as a cardinal requisite to the attainment of the desired improved function and the production of a saw of practical utility that webs extending substantially to full thickness of the main body of the blade be provided between successive teeth.

I claim:

1. A saw blade having thin portions adjacent to its edge, each of said thin portions terminating in a tooth projection having a transverse cutting edge, and a web substantially the full thickness of the main body of the blade interposed between adjacent tooth projections.

2. A saw blade having elongate recesses in its face adjacent to its edge, each of said recesses having a transversely curved inner wall terminating in a tooth projection having a cutting edge extending transversely across it at its thinnest part.

3. A saw blade having two series of teeth each provided with a transverse cutting edge, the cutting edges of the teeth being narrower than the thickness of the main body of the blade, and strengthening pillars interposed between successive teeth of the saw, said pillars being of substantially the same thickness as the main body of the blade.

4. A saw blade having a series of substantially parallel elongate recesses in its opposite faces providing thin webs terminating in tooth projections, the recesses upon opposite sides being staggered and so spaced as to leave pillars of substantially the normal thickness of the blade between each recess on one side and the next adjacent recess on the other side, and a cutting edge extending transversely across each of said tooth projections.

5. A saw blade provided at each side with a series of teeth having transverse cutting edges narrower than the thickness of the metal of the main body of the blade, the teeth of the respective series being staggered relatively to each other, and strengthening webs of a thickness substantially equal to that of the main body of the blade uniting successive teeth of the saw.

6. A saw blade provided at each side with a series of teeth having transverse cutting edges narrower than the thickness of the main body of the blade, the teeth of the respective series being staggered relatively to each other, and strengthening webs of a thickness substantially equal to that of the main body of the blade interposed between successive teeth of the saw, said webs being substantially parallel and inclined to the direction of the operative movement of the saw teeth.

Signed by me at Fitchburg, Massachusetts, this 5th day of February, 1923.

JOHN E. KELLEY.